March 23, 1948.　　　J. F. GUEST　　　2,438,162
JIG OR FIXTURE
Filed March 20, 1943　　　3 Sheets-Sheet 1
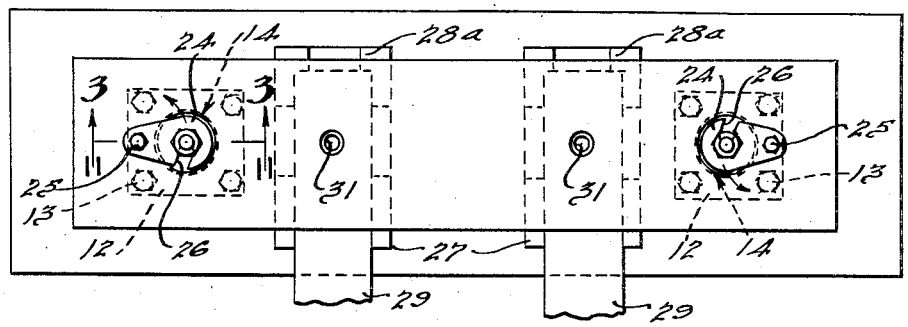
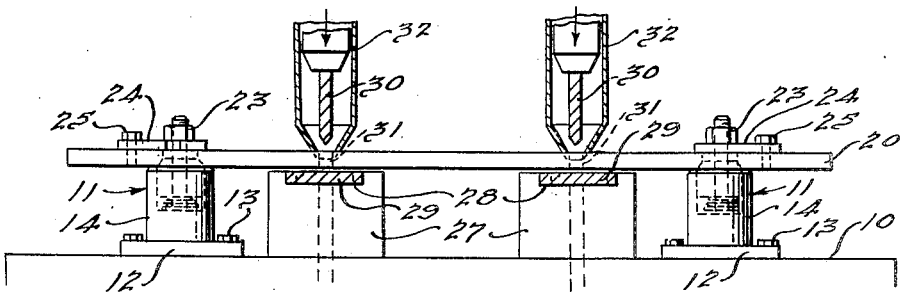
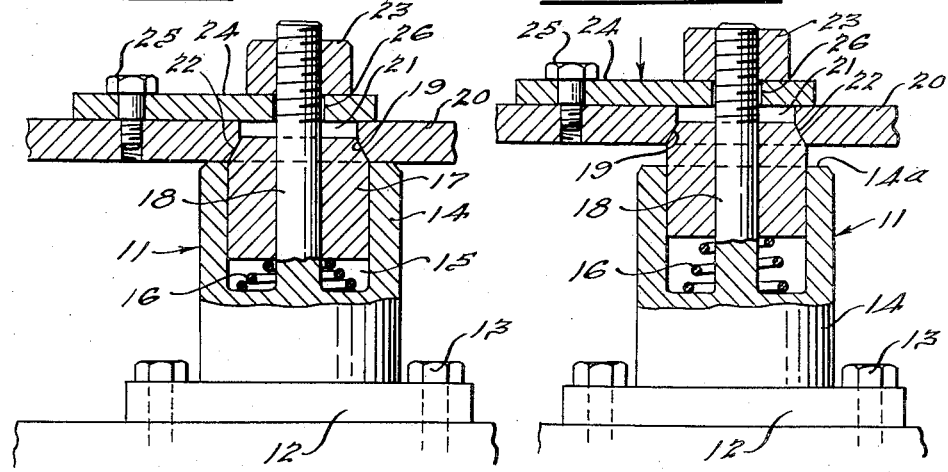
INVENTOR
James F. Guest.
BY Gray + Smith
ATTORNEYS.

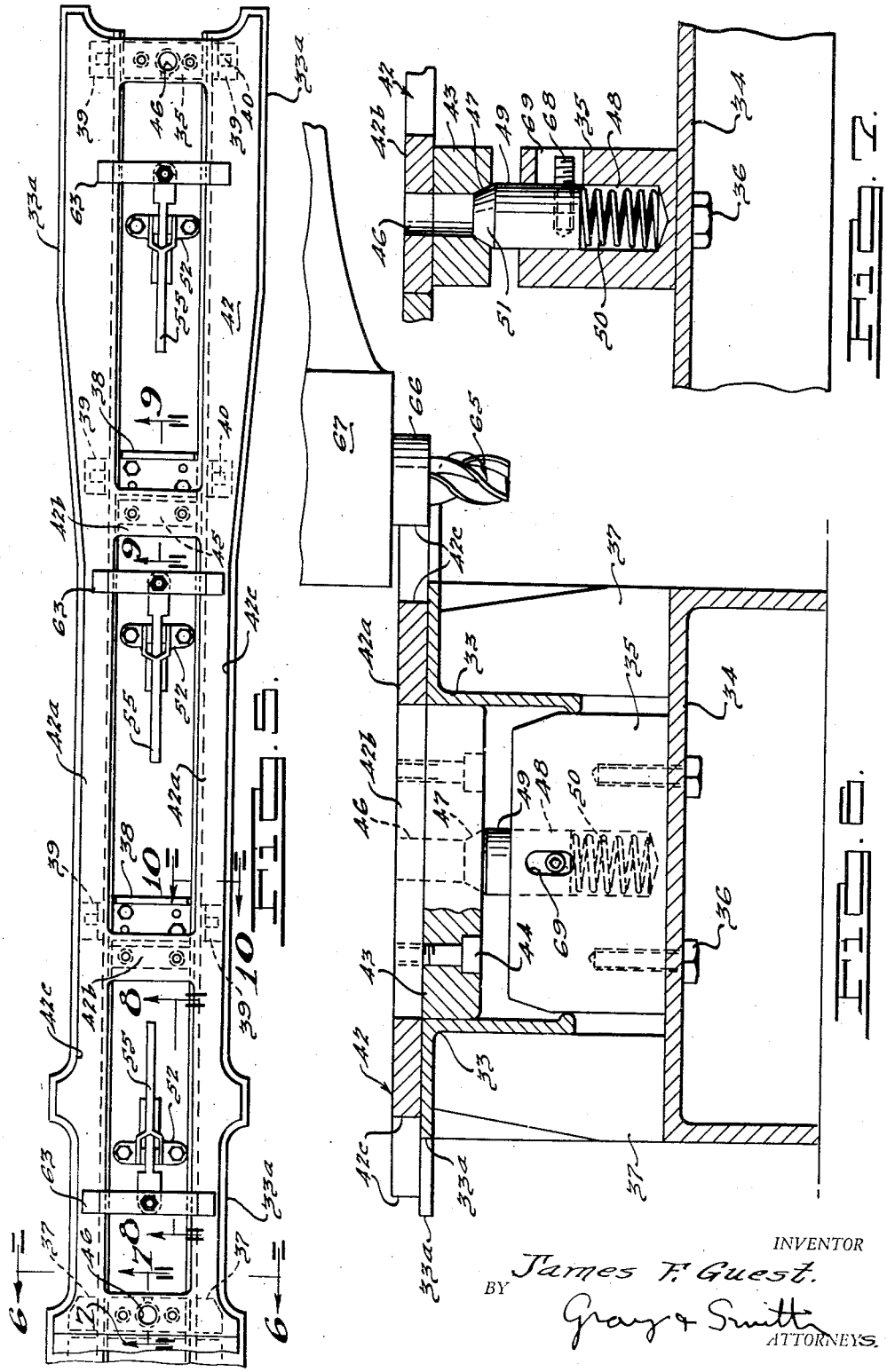

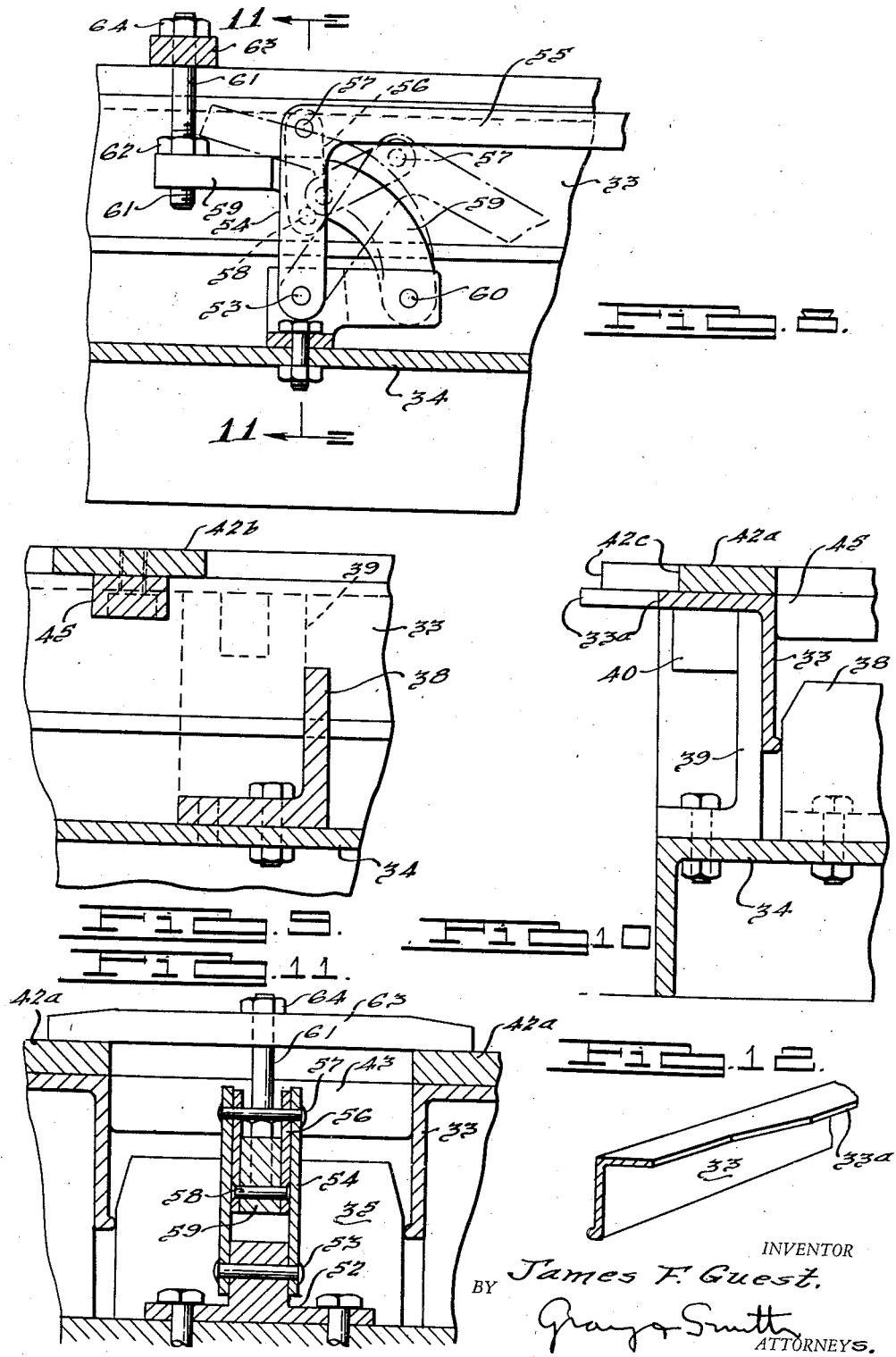

Patented Mar. 23, 1948

2,438,162

UNITED STATES PATENT OFFICE 2,438,162

JIG OR FIXTURE

James F. Guest, Royal Oak, Mich., assignor to Briggs Manufacturing Company, Detroit, Mich., a corporation of Michigan Application March 20, 1943, Serial No. 479,854

14 Claims. (Cl. 77—62)

This invention relates to jigs or gages for guiding or locating tools in respect to workpieces or the like, or for locating the workpieces upon which accurate operations are to be performed, or for aligning or locating relatively movable parts of an apparatus or machine for operating upon a blank or other workpiece. The present invention is susceptible of wide application, and jigs embodying the invention may be used or adapted for use in connection with various kinds of tools or machines requiring accurate operation with exceedingly small allowable tolerances. In the present instance, for the purpose of illustration, the invention in one form thereof is embodied in a drill jig designed to enable the drilling of holes accurately at predetermined points on the workpiece or a plurality thereof, and in another form is embodied in a jig for positioning work blanks for trimming operations.

An important object of the invention is to provide a jig for guiding or aligning a tool with respect to the work and in which the tool guiding member of the jig may be accurately positioned with respect to the position of the work and at the same time easily and quickly handled by the worker.

Another object of the invention is to provide a jig having a plate or gage member for guiding a tool, such as a drill or cutter, or a plurality of such tools, and in which the plate or member is initially positioned upon yieldable centering or gage devices adapted to accurately locate the plate, whereupon the plate may be drawn down tightly against fixed supports or against the work without disturbing the position of the plate, the improved construction being such that the guide plate may be easily and quickly placed in position or removed after an operation thereby saving time without sacrificing accuracy.

Still a further object of the invention is to provide a tool jig having a member, such as a gage plate or member, tool guide or template or the like, for controlling the positioning or operation of the tool in respect to the work, and in which the member may be accurately positioned on tapered surfaces of yieldable centering or locating devices but firmly supported in fixed position independently of said tapered surfaces.

A further object of the invention is to provide a workpiece aligning or locating device having a guide or gage member adapted to be located by spring pressed plungers through the medium of cooperating tapered or bevelled portions on the member and plungers and in which the member is adapted to be bottomed on fixed supports or against the work by pressure means whereby the only force or thrust exerted upon the tapered locating portions is that necessary to overcome the resistance of the springs in bottoming the guide member.

Other objects of this invention will appear in the following description and appended claims, reference being had to the accompanying drawings forming a part of this specification wherein like reference characters designate corresponding parts in the several views.

Fig. 1 is a plan view of an apparatus embodying the present invention.

Fig. 2 is a front elevation thereof.

Fig. 3 is an enlarged vertical section taken substantially through lines 3—3 of Fig. 1 looking in the direction of the arrows, the locating or centering device in this view being shown in operating position.

Fig. 4 is a view similar to Fig. 3 illustrating the gage plate in its initial centered or located position preparatory to being drawn down to the operative position shown in Fig. 3.

Fig. 5 is a fragmentary plan view of an apparatus illustrating a second embodiment of the invention.

Fig. 6 is an enlarged transverse vertical section taken substantially through lines 6—6 of Fig. 5 looking in the direction of the arrows.

Fig. 7 is an enlarged longitudinal vertical section taken substantially through lines 7—7 of Fig. 5 looking in the direction of the arrows.

Fig. 8 is an enlarged longitudinal vertical section taken substantially through lines 8—8 of Fig. 5 looking in the direction of the arrows.

Fig. 9 is an enlarged longitudinal vertical section taken substantially through lines 9—9 of Fig. 5 looking in the direction of the arrows.

Fig. 10 is an enlarged transverse vertical section taken substantially through lines 10—10 of Fig. 5 looking in the direction of the arrows.

Fig. 11 is a section taken substantially through lines 11—11 of Fig. 8 looking in the direction of the arrows.

Fig. 12 is a fragmentary perspective view of an angularly shaped workpiece adapted to be edge trimmed in the apparatus of this embodiment.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there are illustrated, by way of example, two embodiments of the invention as applied to a so-called drill jig and to a jig for work trimming operations. Referring to the embodiment of Figs. 1 to 4, in this instance the apparatus is mounted upon a fixed base or bed 10. In accordance with this embodiment there are provided two spaced similar devices, generally indicated at 11, for centering or locating the gage or guide plate and supporting the same upon the bed 10. Each device 11 comprises a flanged base 12 bolted at 13 to the base and an upright post or stanchion member 14 provided with a cylindrical bore or recess 15. Housed within the recess 15 of each member 14 is a compression spring 16, the lower end of which rests upon the bottom of the recess and the upper end engages a cylindrical plunger 17. Each plunger 17 has a central vertical hole through which extends a cylindrical stem 18 formed as an integral part of the post 14. The length of the plunger 17 of each locating device 11 is such as to cause it to project at all times above the upper flat marginal surface 14a of the post 14, and this upper projecting end is bevelled or tapered annularly as indicated at 19.

The present apparatus also comprises a gage or guide plate 20 which is constructed at opposite ends to cooperate with the spaced locating plungers 17 and the supporting posts 14. The plate 20 at each end is provided with a circular aperture or hole 21 terminating in an annular bevelled portion 22 having a taper corresponding accurately to the taper 19 around the upper edge of the plunger 17. The taper or bevel 19 of each plunger 17 and the corresponding tapered portions 22 in the gage plate 20 may be formed at any suitable corresponding angle, and the construction is such that when the gage plate 20 is placed in position with the cooperating bevelled portions 19 and 22 in engagement at opposite ends of the gage plate, the latter will be located with respect to the bed 10 and the work in exact position.

In the present instance, the upper ends of the stems 18 are threaded to receive nuts 23 which may be turned down to force the gage plate 20 against the upper surfaces 14a of the posts or stanchions 14. Wing nuts may be substituted for the wrench operated nuts 23. The pressure of the nuts 23 may be transmitted through the medium of swinging thrust members 24 each of which is pivoted to the plate 20 by means of a shouldered bolt or screw 25. Each thrust member 24 has an arcuate slot 26 adapted to embrace the stem 18. It will be noted that the diameter of the aperture 21 in each instance is greater than the diameter of the nut 23 so that with the thrust member 24 swung out of position or away from the stem 18, the pressure plate 20 may be mounted in position upon the plungers 17 without removing the nuts 23 from the threaded stems 18 since the nuts will pass through the apertures 21. After mounting the plate 20 upon the plungers 17 so as to accurately locate the plate by means of the cooperating bevelled portions 19 and 22, the thrust pieces 24 may be swung into the position shown in Figs. 1 and 4, it being noted that the widened ends of the thrust members overlie and engage the plate 20 around the edges of the aperture 21. After positioning of the parts as shown in Fig. 4, the nuts 23 are turned down thereby forcing the plungers 17 downwardly against the action of the springs 16 until the gage plate 20 bottoms against the fixed plate supporting surfaces 14a of the posts 14.

The present embodiment illustrates the use of the invention in connection with mechanism for drilling holes at predetermined locations in workpieces. To illustrate this application of the invention there are shown at 27 two spaced work supporting members having guideways 28 to receive two workpieces 29. The guideways terminate in suitable abutments 28a so as to provide accurate gages for positioning the workpieces 29. At 30 are shown two spaced vertically movable drills adapted to be shifted through accurately located countersunk holes 31 in the gage plate 20 when drilling correspondingly aligned holes in the workpieces 29. The drill units are provided with locating sleeves 32 having tapered ends adapted to be positioned by the workman in the correspondingly tapered countersunk portions of the holes 31, thus lining up the drills with these holes. The sleeves 32 are supported by the drill units independently of the rotating drill chucks.

From the foregoing it will be seen that the gage plate 20 may be initially positioned and located with considerable accuracy upon the yieldable plungers 17 by means of the cooperating bevelled portions 19 and 22 whereupon by turning down the nuts 23 the gage plate may be bottomed upon the fixed supporting surfaces 14a of the posts 14 without in any way disturbing the accurate location of the plate on the bevelled ends 19 of the plungers. These bevelled portions of the plate and plungers are not required to take any thrust or pressure other than necessary to compress the springs 16. They permit the plate 20 to be easily lifted off the plungers 17 or placed thereon regardless of whether the plate is held level or tilted.

In Figs. 5 to 12 inclusive there is illustrated a second embodiment of the invention comprising an apparatus for positioning and clamping in place a pair of workpieces or blanks 33 which are adapted to be trimmed along their edges. In the present instance each workpiece 33 is in the form of an angle having its upper horizontal flange of irregular shape and contour and adapted to be positioned in the apparatus so that the edge of this flange may be accurately trimmed.

In accordance with this embodiment of the invention the apparatus comprises a suitable base 34 in the form of an inverted channel which is adapted to be supported upon a foundation or bed. Adjacent each end of the jig or apparatus, as illustrated in Fig. 5, is a gage block 35 secured as by means of screws 36 to the top surface of the base 34, see Figs. 6 and 7. Located at opposite ends of each of the gage blocks 35 and suitably spaced from the opposite ends thereof are a pair of blocks 37 rigidly secured to the base 34. As illustrated in Fig. 6 the blocks 35 and 37 are spaced apart so as to receive therebetween the vertical flanges of the workpieces 33 and to position them with respect to the gage block 35. At intervals along the base 34 are located a number of angle members 38, see Figs. 9 and 10, which are bolted to the base 34 and extend transversely with respect thereto. These angle members 38 cooperate with longitudinally positioned angle members 39 also bolted to the base to assist in positioning the vertical flanges of the workpieces 33. As shown in Fig. 10, the angle members 38 and 39 are spaced similarly to the blocks 35 and 37 to receive and locate the lower edges of the vertical flanges of the workpieces 33. The vertical web of each angle member 39 is provided with a laterally extending block 40 forming a rest for the upper horizontal flange of the workpiece 33, see Fig. 10.

Cooperable with the workpieces 33 and adapted to clamp them in accurately located positions for the trimming operations to be performed upon these workpieces, is a gage member or guide plate 42. This plate in the present instance is of skeleton construction comprising similar and generally parallel longitudinal rails 42a connected at intervals by integral cross-webs 42b. The lateral edges 42c of the gage plate 42 are accurately machined or formed since they determine the contour of the finally trimmed edges of the workpieces 33. At its opposite ends the gage plate 42 is provided with a pair of transverse gage blocks 43, see Figs. 6 and 7. When the gage plate 42 is placed in position the blocks 43 lie directly above the gage blocks 35. The centering or locating blocks 43 are secured to the end cross-webs 42b of the gage plate as by means of screws 44. At intervals, intermediate the blocks 43, are provided centering blocks 45 which may be substantially similar to the blocks 43 and secured to the transverse webs 42b of the gage plate, as illustrated in Figs. 9 and 10.

From the foregoing it will be seen that the workpieces 33 may first be positioned with their vertical flanges guided into the spaces between the respective blocks 35 and 37, and the angles 38 and 39. When positioned in this manner the upper flanges of the workpieces 33 rest upon the blocks 37 and 40. After the workpieces have been positioned in this manner the gage or guide plate 42 is then placed in position with its side rails 42a engaging the upper faces of the horizontal flanges of the workpieces 33, see Figs. 6, 10 and 11. Also the several gage or locating blocks 43 and 45 fit snugly between the vertical flanges of the workpieces and locate them with respect to the blocks 37 and the angles 39.

As illustrated in Fig. 7, a hole 46 is drilled through the gage block 43, also through the web 42b of the gage plate. The lower end of this hole is countersunk to provide a flared tapered recess 47, similar in all respects to the tapered portion 22 in the previous embodiment. Each gage block 35 is provided with a cylindrical hole 48 within which is slidingly mounted a cylindrical plunger 49, similar to the plunger 17 of the previous embodiment. The plunger 49 acts against a compression spring 50 interposed between the plunger and the bottom of the hole 48. The upper end of the plunger 49 is provided with a tapered portion 51 which is accurately machined to the same angle as the tapered portion 47. These corresponding tapered portions 47 and 51 are adapted to cooperate in the manner illustrated in Fig. 7 and also in the same manner as in the previous embodiment for the purpose of accurately locating the gage plate preliminarily to clamping it in position before the start of an operation. In the present embodiment two locating or centering devices, comprising parts 43 and 49 with their cooperating tapered portions 47 and 51, are located at opposite ends of the jig or fixture shown in Fig. 5.

The gage plate 42 may be drawn down against the upper horizontal flanges of the workpieces 33 to clamp them rigidly against their supports by means of devices such as illustrated in Figs. 8 and 11, three of these being illustrated in the embodiment illustrated in Fig. 5. Each clamp device includes a handle lever which may be shifted in one direction to operate a clamp bar and exert downward pressure on the gage plate and which may be shifted in the opposite direction to release the gage plate. Bolted to the base member 34 is a suitable bracket 52 to which is pivoted at 53 one arm 54 of a lever, the other arm 55 extending longitudinally in the space between the side rails 42a of the gage plate and in position to be readily grasped. The arm 54 of the lever comprises two parallel pieces which straddle a spacer portion of the bracket 52. The arm 55 of the lever is of similar two-part construction. A link 56 is positioned between the side pieces of the arm 54 and is pivoted at 57 to the upper end thereof. This link 56 comprises parallel side pieces which embrace a lever arm 59 to which the lower end of the link 56 is pivoted at 58. The lever 59 at its lower end is fulcrumed at 60 to an extension of the bracket 52. The opposite end of the lever 59 is provided with a vertical tapped hole into which is threaded a vertical pin 61. This pin is held in adjusted position with respect to the arm 59 by means of a nut 62. The upper end of the pin extends through a hole in a clamping bar 63 which is swivelled on the pin and held in position by means of a nut 64 threaded on to the upper end of the pin. From the foregoing construction it will be seen that when the handle 55 is depressed, thereby swinging the lever arm 54 about its pivot 53, the link 56 will be shifted, as illustrated in Fig. 8, to swing the arm 59 vertically about its pivot 60 thus raising the clamping bar 63 and releasing the pressure on the gage plate. When the handle 55 is raised the link 56 will be shifted in the opposite direction, thereby swinging the arm 59 downwardly and drawing down the clamping bar 63 against the upper face of the gage plate 42. This action will also result in locking the handle lever 55 since the pivot 57 of the link 56 will pass beyond a dead center line passing through the pivots 53 and 58.

From the foregoing it will be seen that the gage plate 42 may be readily located by means of the tapered portions 47 and 51, in the same manner as the previous embodiment. In this embodiment, however, the gage plate is utilized to clamp the workpieces 33 against their supports and also to position the workpieces, this being accomplished through the medium of the blocks 43 and 45 carried by the gage plate. After the clamping bars 63 have been actuated to rigidly clamp the gage plate against the upper flanges of the workpieces 33, the edges 33a of the workpieces may be trimmed by means of a suitable cutter 65, see Fig. 6. This cutter is provided with a guide sleeve or roller 66 secured to the cutter head 67 and which is adapted to travel along the edge 42c of the gage plate so as to cause the cutter 65 to accurately trim the edge of the work.

The plunger 49 may be held within the hole 48 in the block 35 against withdrawal and especially to prevent the plunger from dropping out in cases where the jig is inverted. Accordingly, the plunger is provided with a transverse tapped hole to receive a threaded pin 68 the projecting end of which extends within a vertical slot 69 in the side of the block 35. The height of the slot 69 is sufficient to permit the necessary vertical movement of the plunger 49 when the clamping bars 63 are drawn down to clamp the gage plate against the work.

I claim:

1. A jig or fixture comprising a gage plate, work supporting means, a plurality of vertically movable plungers, springs associated with said plungers to urge them into predetermined extended positions, said plungers having tapered ends cooperable with tapered portions of said plate to locate and support the same independently of said supporting means, and means for drawing down said plate to clamp a workpiece on said supporting means while depressing said plungers against the action of the springs.

2. A jig or the like, comprising work supporting means, a gage member, a plurality of vertically movable plungers, springs associated with said plungers to urge them into predetermined extended positions, said plungers having tapered ends cooperable with tapered portions of said member to support said member at a predetermined location above and substantially free of the supporting means, and means for forcing said member into work clamping position while depressing said plungers against the action of the springs.

3. A jig or the like, comprising a guide plate, a plurality of vertically movable spring controlled plungers terminating in annular bevelled upper ends, said plate having apertures formed with correspondingly bevelled edges cooperable with said bevelled ends to locate the plate, work supporting means beneath said plate, said plungers adapted to support said plate free of and in spaced relation to said supporting means, and means for drawing down said plate toward the work supporting means while depressing the plungers.

4. A jig or fixture, comprising means for supporting and positioning a workpiece, a plurality of spaced plunger guides, a spring controlled plunger carried by each guide and terminating in a bevelled end, a gage member having spaced apertures provided with bevelled edges cooperable with the bevelled ends of said plungers to locate the gage member in predetermined position above the workpiece, and means for drawing down said gage member against said workpiece to clamp it against its supporting means.

5. A jig or fixture, comprising means for supporting and positioning a workpiece, a plurality of spaced plunger guides, a spring controlled plunger carried by each guide and terminating in a bevelled end, a gage member having spaced apertures provided with bevelled edges cooperable with the bevelled ends of said plungers to locate the gage member in predetermined position above the workpiece, and means for drawing down said gage member to a fixed position with respect to said supporting means while yieldingly depressing said plungers.

6. A jig or fixture, comprising means for supporting and positioning a workpiece, a plurality of spaced plunger guides, a spring controlled plunger carried by each guide and terminating in a bevelled end, a gage member having spaced apertures provided with bevelled edges cooperable with the bevelled ends of said plungers to locate the gage member in predetermined position with the gage member supported by the plungers above and in spaced relation to the workpiece, and means for drawing down said gage member to fixed position in juxtaposed relation to the workpiece while yieldingly depressing said plungers.

7. A jig or fixture, comprising means for supporting and positioning a workpiece, a plurality of spaced plunger guides, a spring controlled plunger carried by each guide and terminating in a bevelled end, a gage member having spaced apertures provided with bevelled edges cooperable with the bevelled ends of said plungers to locate the gage member in predetermined position with the gage member supported by the plungers above and in spaced relation to the workpiece, and means for drawing down said gage member to fixed position in engagement with the workpiece while yieldingly depressing said plungers.

8. A jig or fixture, comprising means for supporting and positioning a workpiece, a plurality of spaced plungers having bevelled ends, means for guiding said plungers for up and down rectilinear movement, springs normally holding said plungers in extended positions, a gage member having bevelled portions cooperable with said bevelled ends to locate the gage member in predetermined position with the gage member supported by said plungers, and means for forcing said gage member downwardly toward the workpiece while depressing the plungers against the action of their springs.

9. A jig or fixture, comprising means for supporting and positioning a workpiece, a plurality of spaced plungers having bevelled ends, means for guiding said plungers for up and down rectilinear movement, springs normally holding said plungers in extended positions, a gage member having bevelled portions cooperable with said bevelled ends to locate the gage member in predetermined position with the gage member supported by said plungers above and in spaced relation to the workpiece, and means for forcing said gage member downwardly toward the workpiece while depressing the plungers against the action of their springs.

10. A jig or fixture, comprising means for supporting and positioning a workpiece, a plurality of spaced plungers having bevelled ends, means for guiding said plungers for up and down rectilinear movement, springs normally holding said plungers in extended positions, a gage member having bevelled portions cooperable with said bevelled ends to locate the gage member in predetermined position with the gage member supported by said plungers, and means for forcing said gage member downwardly toward the workpiece to clamp the same against said supporting means while depressing the plungers against the action of their springs.

11. A jig or fixture, comprising means for supporting and positioning a workpiece, a plurality of spaced plungers having bevelled ends, means for guiding said plungers for up and down rectilinear movement, springs normally holding said plungers in extended positions, a gage member having bevelled portions cooperable with said bevelled ends to locate the gage member in predetermined position with the gage member supported entirely by said plungers, and means for forcing said gage member downwardly toward the workpiece to clamp the same in fixed position relatively to said supporting means while yieldingly depressing the plungers.

12. In a jig or fixture, work supporting means, a gage plate having means for positioning the work relatively to said means, a plurality of plunger guides, spring pressed plungers slidable up and down on said guides and terminating in bevelled ends cooperable with bevelled portions on the gage plate to locate the plate relatively to the work supporting means, said plungers adapted initially to support the gage plate free of the work and adapted to be forced down against the work while depressing the plungers.

13. In a jig or fixture, work supporting means, a gage plate, a plurality of plunger guides, spring pressed plungers slidable up and down on said guides and terminating in bevelled ends cooperable with bevelled portions on the gage plate to locate the plate relatively to the work supporting means, said plungers adapted initially to support the gage plate free of the work and adapted to be forced down against the work while depressing the plungers.

14. In a jig or fixture, work supporting means, a gage plate, a plurality of plunger guides, spring pressed plungers slidable up and down on said guides and terminating in bevelled ends cooperable with bevelled portions on the gage plate to locate the plate relatively to the work supporting means, said plungers adapted initially to support the gage plate free of the work and adapted to be forced down against the work while depressing the plungers, said plungers and guides having pin and slot connections limiting the range of vertical movement of the plungers.

JAMES F. GUEST.

REFERENCES CITED

The following references are of record in the file of this patent:

UNITED STATES PATENTS

| Number | Name | Date |
|---|---|---|
| 800,559 | Edgerton | Sept. 26, 1905 |
| 883,869 | Fortin | Apr. 7, 1908 |
| 1,923,440 | Hunt et al. | Aug. 22, 1933 |
| 2,176,089 | Malone | Oct. 17, 1939 |
| 2,342,059 | Moss | Feb. 15, 1944 |

OTHER REFERENCES

American Machinist, July 7, 1921, pp. 18–21, published by McGraw-Hill Publishing Co., 330 W. 42d St., New York, New York; ibid., July, 1931, pp. 221–222.

Machinery, Feb. 1929, pp. 428–429, published by Industrial Press, 140-8 Lafayette St., New York; ibid., July, 1931 pp. 857–858.